(12) United States Patent
Uchiyama et al.

(10) Patent No.: US 8,871,671 B2
(45) Date of Patent: Oct. 28, 2014

(54) HYDROGEN STORAGE UNIT

(75) Inventors: Naoki Uchiyama, Hamamatsu (JP);
Tomomi Kanai, Hamamatsu (JP);
Kazumi Harada, Hamamatsu (JP)

(73) Assignee: Kabushiki Kaisha Atsumitec, Shizuoka (JP)

( * ) Notice: Subject to any disclaimer, the term of this patent is extended or adjusted under 35 U.S.C. 154(b) by 133 days.

(21) Appl. No.: 13/393,792

(22) PCT Filed: Sep. 4, 2009

(86) PCT No.: PCT/JP2009/065505
§ 371 (c)(1),
(2), (4) Date: Mar. 1, 2012

(87) PCT Pub. No.: WO2011/027462
PCT Pub. Date: Mar. 10, 2011

(65) Prior Publication Data
US 2012/0171461 A1    Jul. 5, 2012

(51) Int. Cl.
| | | |
|---|---|---|
| *B32B 3/26* | (2006.01) | |
| *B01J 21/10* | (2006.01) | |
| *B82Y 99/00* | (2011.01) | |
| *B22F 1/02* | (2006.01) | |
| *B22F 7/00* | (2006.01) | |
| *C22C 47/06* | (2006.01) | |
| *C01B 3/00* | (2006.01) | |
| *C22C 23/00* | (2006.01) | |
| *C22C 49/04* | (2006.01) | |

(52) U.S. Cl.
CPC . *B22F 1/02* (2013.01); *B22F 7/002* (2013.01); *C22C 47/062* (2013.01); *C01B 3/0031* (2013.01); *Y02E 60/327* (2013.01); *C01B 3/0078* (2013.01); *C22C 23/00* (2013.01); *C01B 3/0042* (2013.01); *C22C 2202/04* (2013.01); *C22C 49/04* (2013.01)
USPC ............ 502/324; 502/326; 502/328; 502/416

(58) Field of Classification Search
USPC .......... 96/108; 428/304.4; 502/324, 326, 328; 977/762
See application file for complete search history.

(56) References Cited

U.S. PATENT DOCUMENTS

| | | | |
|---|---|---|---|
| 5,964,965 A | 10/1999 | Schulz | |
| 7,211,541 B2 | 5/2007 | Fetcenko | |
| 7,968,191 B2 * | 6/2011 | Hampden-Smith et al. | .. 428/408 |
| 2005/0129566 A1 | 6/2005 | Fetcenko | |

(Continued)

FOREIGN PATENT DOCUMENTS

| | | | |
|---|---|---|---|
| JP | 55149101 A * | 11/1980 | ................ C01B 3/00 |
| JP | 63-072849 | 4/1988 | |

(Continued)

OTHER PUBLICATIONS

JP 2004256860 machine translation performed by AIPN/PAJ.*

*Primary Examiner* — Duane Smith
*Assistant Examiner* — Cabrena Holecek
(74) *Attorney, Agent, or Firm* — Cozen O'Connor

(57) ABSTRACT

A hydrogen storage alloy unit comprises a porous body 7 having a large number of holes (spaces) 9 allowing hydrogen atoms to pass through, and a hydrogen storage alloy covering a surface of the porous body 7, inclusive of surfaces of the holes thereof. The hydrogen storage alloy includes a hydrogen storage base formed of a hydrogen storage material, and a catalytic layer covering a surface of the hydrogen storage base. The porous body 7 is formed of an assembly of hydrogen storage fibers 8 formed by vapor-depositing the hydrogen storage alloy onto nanofibers.

6 Claims, 5 Drawing Sheets

(56) References Cited

U.S. PATENT DOCUMENTS

2006/0266441 A1 11/2006 Fetcenko

FOREIGN PATENT DOCUMENTS

| | | | | |
|---|---|---|---|---|
| JP | 63072849 A | * | 4/1988 | ............ C22C 23/00 |
| JP | 63-177397 | | 11/1988 | |
| JP | 11-503489 | | 3/1999 | |
| JP | 2001-296238 | | 10/2001 | |
| JP | 2004-256860 | | 9/2004 | |
| JP | 2004-261675 | | 9/2004 | |
| JP | 2004256860 A | * | 9/2004 | ............ B22F 1/02 |
| JP | 2007-520629 | | 7/2007 | |

\* cited by examiner

US 8,871,671 B2

HYDROGEN STORAGE UNIT

RELATED APPLICATIONS

This application is a U.S. National Phase Application under 35 USC 371 of International Application PCT/JP2009/065505 filed Sep. 4, 2009.

TECHNICAL FIELD

This invention relates to a hydrogen storage unit capable of storing hydrogen.

BACKGROUND ART

Fuel cells used in vehicles and others use gaseous hydrogen. Since gaseous hydrogen is very large in volume, compressed hydrogen gas is used. The volume thereof is however still large for practical use, leading to space problems. Liquid hydrogen is smaller in volume than gaseous hydrogen. Holding liquid hydrogen is however difficult and not suited for practical use. Thus, use of hydrogen in the solid state has been being studied and developed to provide reduced volume and enhanced ease of handling. Hydrogen is used in the solid state by being stored in alloys. Such alloys are called hydrogen storage alloys. Hydrogen storage alloys repeat absorbing and releasing hydrogen.

A hydrogen gas sensor using such a hydrogen storage alloy is disclosed in patent document 1. The hydrogen gas sensor disclosed in patent document 1 comprises a substrate, a Pd—Ag alloy layer vapor-deposited on a surface of the substrate, and a thin film of Pd or Pt formed thereon.

The substrate disclosed in patent document 1 is however in the form of a plate. Accordingly, the layer of the hydrogen storage alloy, vapor-deposited on this substrate, provides an area of contact with hydrogen approximately equal to the surface area of the substrate. In light of recent years' demand for storage of a larger amount of hydrogen, an increase in the ability to store hydrogen is required.

PRIOR ART DOCUMENT

Patent Document

Patent document 1: Japanese Patent Application Laid-open No. 2001-296238 Publication

SUMMARY OF THE INVENTION

Problem to be Solved by the Invention

Considering the aforementioned prior art, the present invention aims to provide a hydrogen storage unit which can provide an increased area of contact with hydrogen, and thus, efficiently store a large amount of hydrogen.

Means for Solving the Problem

In order to achieve this object, the invention recited in item 1 is a hydrogen storage unit, comprising a porous body having a large number of holes allowing hydrogen molecules to pass through, and a hydrogen storage alloy covering a surface of the porous body, inclusive of surfaces of the holes thereof, said hydrogen storage alloy including a hydrogen storage base formed of a hydrogen storage material, and a catalytic layer covering a surface of the hydrogen storage base.

The invention recited in item 2 is a hydrogen storage unit of the type recited in item 1 wherein the porous body is formed of an assembly of nanofibers.

The invention recited in item 3 is a hydrogen storage unit of the type recited in item 2 wherein the individual nanofibers are randomly oriented in the assembly.

The invention recited in item 4 is a hydrogen storage unit of the type recited in item 2 wherein the assembly is in the form of nonwoven fabric.

The invention recited in item 5 is a hydrogen storage unit of the type recited in item 1 wherein the hydrogen storage base is a layer vapor-deposited on the surface of the porous body.

The invention recited in item 6 is a hydrogen storage unit of the type recited in item 1 wherein the hydrogen storage base is formed of a mixture of magnesium and an alloy selected from a group consisting of a magnesium-nickel alloy, a magnesium-titanium alloy, a magnesium-niobium alloy, a magnesium-manganese alloy and a magnesium-cobalt alloy.

The invention recited in item 7 is a hydrogen storage unit of the type recited in item 6 wherein the catalytic layer is formed of Pd.

EFFECT OF THE INVENTION

In the invention recited in item 1, the hydrogen storage alloy, which covers the surface of the porous body having a large number of holes for hydrogen atoms to pass through, has a large surface area, and thus, provides a large area of contact with hydrogen, leading to quick absorption of hydrogen.

In the invention recited in item 2, nanofibers tangled into an assembly provide a large number of spaces serving as holes allowing hydrogen to pass through. The porous body of this type is easy to form.

In the invention recited in item 3, nanofibers are formed into an assembly by simply tangling them, not by deliberately arranging them in a specific arrangement. Even the assembly formed this way provides holes allowing hydrogen to pass through, thereby enabling quick absorption of hydrogen.

In the invention recited in item 4, the assembly of nanofibers is in the form of nonwoven fabric. The porous body of this type provides enhanced ease of handling.

In the invention recited in item 5, a layer of the hydrogen storage alloy is formed on the porous body by vapor deposition. The hydrogen storage unit of this type is easy to produce and capable of quickly storing hydrogen.

In the invention recited in item 6, the hydrogen storage alloy exhibits both a high ability to store hydrogen and a high ability to cause hydrogen to diffuse in it in the solid state, provided by Mg and an alloy ($Mg_2Ni$ is particularly desirable), respectively. Hydrogen absorbed in Mg in one region is passed on to Mg (or $Mg_2Ni$) in another region by virtue of $Mg_2Ni$, for example. Since this movement of hydrogen does not require heat nor pressure, hydrogen can be absorbed at room temperature and atmospheric pressure.

In the invention recited in item 7, Pd catalyzes dissociation of molecular hydrogen into hydrogen atoms ($H_2 \rightarrow 2H$). Hydrogen in the form of atoms is most quickly absorbed in Mg. Unlike Pt, Pd does not have the ability to catalyze ionization of hydrogen atoms. Thus, use of Pd as a catalyst allows hydrogen to stay in the form of atoms, which leads to quick absorption of hydrogen compared with when Pt is used as a catalyst.

MODE OF CARRYING OUT THE INVENTION

Figure 1:
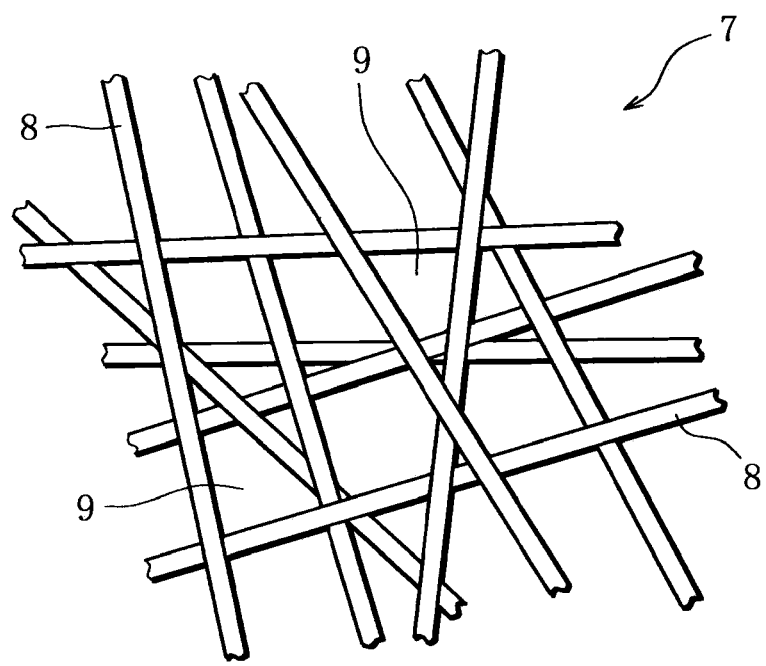
FIG. 1 is a schematic diagram showing a hydrogen storage unit according to the present invention.

FIG. 1 is a schematic diagram showing a hydrogen storage unit according to the present invention.

As illustrated, the hydrogen storage unit 7 according to the present invention is formed of an assembly of hydrogen storage fibers 8, namely nanofibers with a hydrogen storage alloy 1 (see FIGS. 2 to 5) vapor-deposited thereon. A large number of hydrogen storage fibers 8 are tangled to intersect one another, thereby providing spaces 9 between one another. The individual nanofibers may be randomly oriented, but are tangled to provide spaces 9 having a size allowing hydrogen molecules to pass through. The hydrogen storage alloy 1, vapor-deposited on such nanofibers, can provide a large surface area of a hydrogen storage base 2 (see FIGS. 2 to 5), and thus, provide a large area of contact with hydrogen. Specifically, the spaces 9 function as holes for hydrogen molecules to pass through, thereby allowing hydrogen to be absorbed not only in a surface region of the hydrogen storage unit 7 but also in an inner region of the hydrogen storage unit 7, thus enabling quick absorption of hydrogen.

If nanofibers used have many holes in themselves, or in other words, they are porous nanofibers, for example, the hydrogen storage base 2 can have a further increased surface area, and thus, a further increased area of contact with hydrogen, enabling quicker absorption of hydrogen. The hydrogen storage unit may be formed using other porous materials having holes allowing hydrogen to pass through (nonwoven fabric, for example). The nanofibers may be made into nonwoven fabric. The hydrogen storage unit 7 may be produced by simultaneously producing a hydrogen storage alloy 1 and nanofibers, for example by simultaneously subjecting respective solutions to reaction, or by separately producing an hydrogen storage alloy 1 and nanofibers and then vapor-depositing the former onto the latter by a process such as sputtering.

Figure 2:
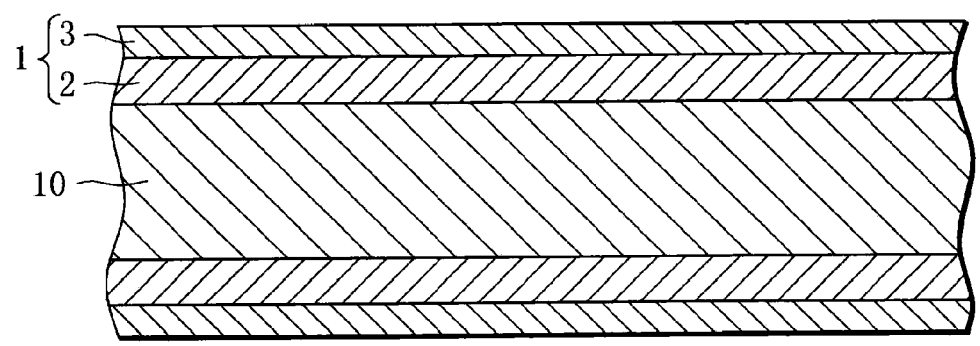
FIG. 2 shows a longitudinal cross-sectional view of a hydrogen storage fiber.
Figure 3:
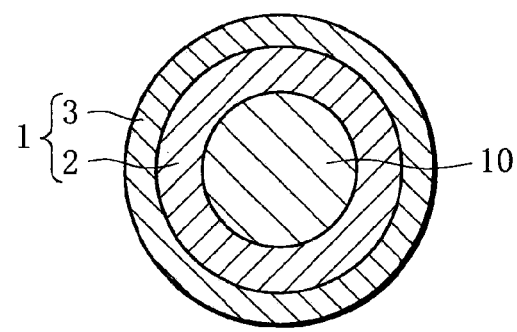
FIG. 3 is a transverse cross-sectional view of the hydrogen storage fiber shown in FIG. 2.

FIG. 2 is a longitudinal cross-sectional view of a hydrogen storage fiber, and FIG. 3 a transverse cross-sectional view of the hydrogen storage fiber shown in FIG. 2.

As illustrated, a hydrogen storage fiber 8 comprises a nanofiber 10, a hydrogen storage base (hydrogen storage layer) 2 and a catalytic layer 3. More specifically, a layer of a hydrogen storage alloy 1 is vapor-deposited on the surface of the nanofiber 10. A large number of such hydrogen storage fibers 8 are tangled to intersect one another and form an assembly functioning as a hydrogen storage unit 7. When the nanofiber 10 has a smooth surface, the hydrogen storage alloy is uniformly vapor-deposited, as illustrated. The nanofibers can be produced by electrospinning or other processes.

Hydrogen storage metallic materials usable to form the hydrogen storage base include FeTi (forming $FeTiH_{17}$ by storing hydrogen), $LaNi_5$ (forming $LaNi_5H_6$ by storing hydrogen), BaRe (forming $BaReH_9$ by storing hydrogen), MgNi (forming $MgNiH_4$ by storing hydrogen), MgFe (forming $MgFeH_6$ by storing hydrogen), Mg (forming $MgH_2$ by storing hydrogen), $Mg_2Ni$ (forming $Mg_2NiH_4$ by storing hydrogen), $GdMgNi_4$, $Mg_{0.7}GdNi_2$, $Mg_{50}Co_{50}$, $Mg_{70}Al_{30}$, $Mg_9Ti_{0.5}Ni_{0.5}$, and $MgPd_{0.08}$.

Hydrogen storage nonmetallic materials usable to form the hydrogen storage base include NaAl (forming $NaAlH_4$ by storing hydrogen), KB (forming $KBH_4$ by storing hydrogen), LiAl (forming $LiAlH_4$ by storing hydrogen), Li (forming LiH by storing hydrogen), NaB (forming $NaBH_4$ by storing hydrogen), $AlB_3$ (forming $Al(BH_4)_3$ by storing hydrogen), and LiB (forming $LiBH_4$ by storing hydrogen). Other hydrogen storage materials usable to form the hydrogen storage base include $Mg_3N_2$-$4Li_3N$, C—$Li_2Mg$ $(NH)_2$, $Mg_{100}$-$xLi_{100}$, Ti—Cr—V alloys, Ti—Mo—V alloys, Mg—Si alloys, Mg—Co alloys, Mg—Sm—Ni alloys, Mg—Nd—Ni alloys, Mg—Pr—Ni alloys and Mg—La—Ni alloys.

Materials usable to form the catalytic layer 3 include Pd (palladium), Pt (platinum), Nb (niobium) and ZrNi (zirconium-nickel).

Figure 4:
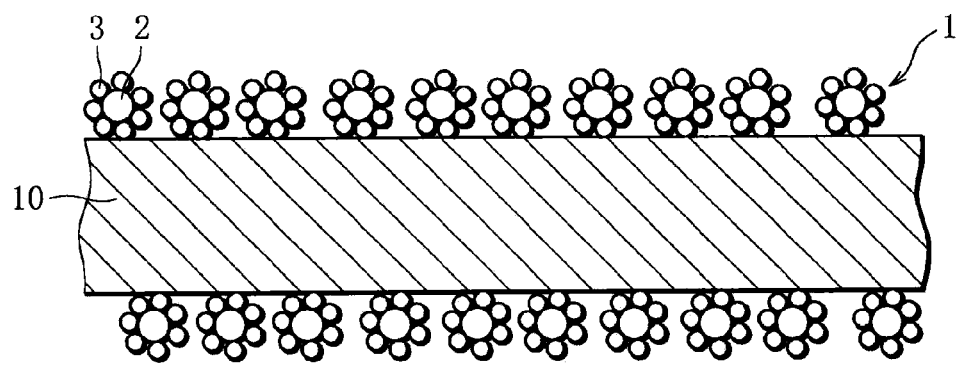
FIG. 4 shows a longitudinal cross-sectional view of a hydrogen storage fiber of another type.
Figure 5:
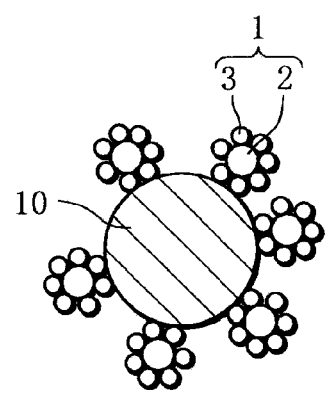
FIG. 5 is a transverse cross-sectional view of the hydrogen storage fiber shown in FIG. 4.

FIG. 4 is a longitudinal cross-sectional view of a hydrogen storage fiber of another type, and FIG. 5 a transverse cross-sectional view of the hydrogen storage fiber shown in FIG. 4.

As illustrated, a hydrogen storage alloy 1 is in the form of nanoparticles having a sphere-shaped hydrogen storage base of a hydrogen storage material (hydrogen storage core) 2 surround by a spherical catalyst layer 3. The hydrogen storage cores 2 and the catalyst layer 3 form a colloid. The hydrogen storage fiber 8 is a nanofiber 10 with such nanoparticles of the hydrogen storage alloy adhering to its circumference.

As understand from the above, the hydrogen storage alloy 1 can be obtained in various forms by using appropriately—selected alloy 1—making processes.

Figure 6:
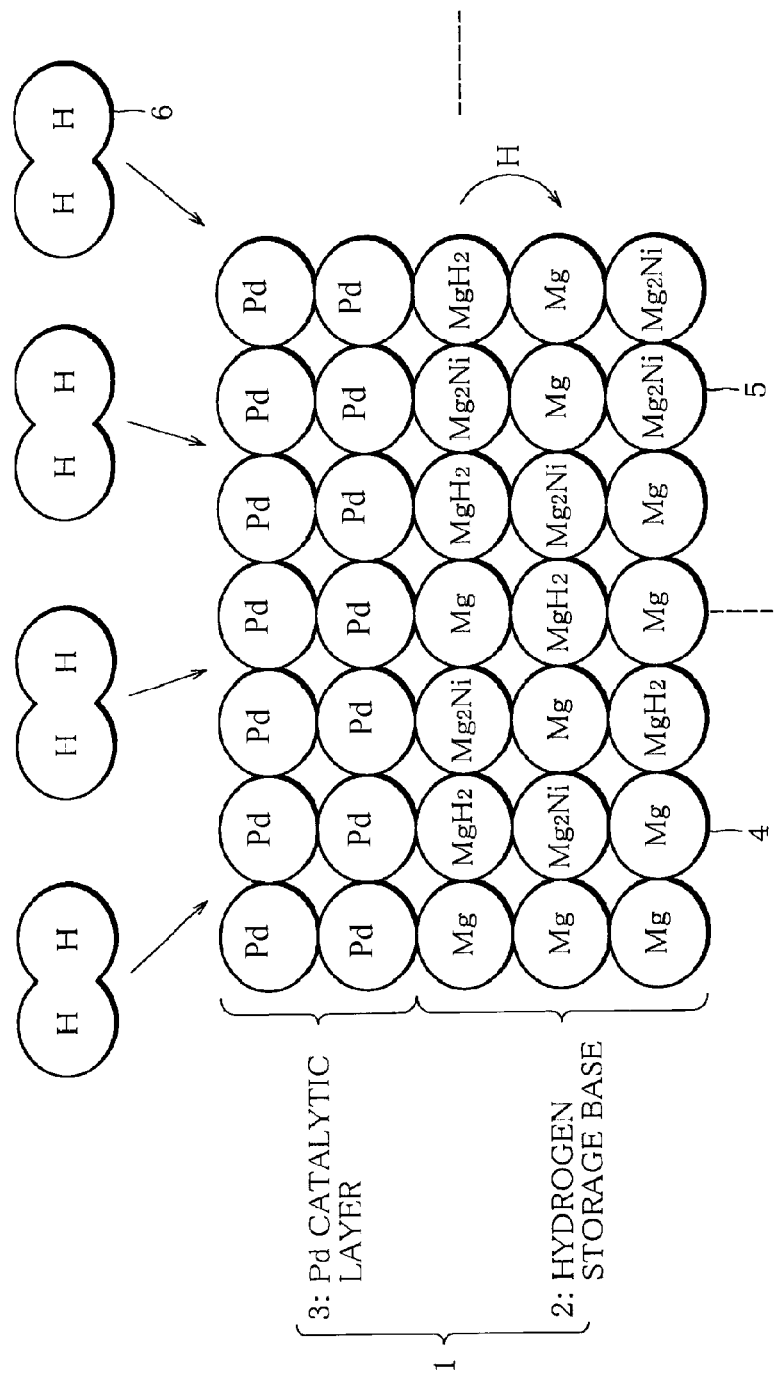
FIG. 6 is a schematic diagram showing an example of hydrogen storage alloy according to the present invention.

FIG. 6 is a schematic diagram showing an example of hydrogen storage alloy according to the present invention.

As illustrated, a hydrogen storage alloy 1 according to the present invention comprises a hydrogen storage base 2 and a catalytic layer 3. The hydrogen storage base 2 is a thin film of a mixture of a metal Mg 4 and an alloy (in the illustrated example, $Mg_2Ni$ 5). The ratio between Mg 4 and $Mg_2Ni$ 5 in the mixture is 0 to 10 (exclusive of 0) molecules of Mg for 1 molecule of $Mg_2Ni$, more desirably 4 to 8 molecules of Mg for 1 molecule of $Mg_2Ni$. It is particularly desirable that the mixture have composition represented by chemical formula $Mg_6Ni$. Mg 4 and $Mg_2Ni$ 5 mixed this way experience chemical reactions shown below. As indicated by arrows in the illustration, hydrogen atoms H are passed on to Mg (or $Mg_2Ni$) in an inner region. This means that hydrogen actively diffuses in the solid-state base 2, and thus, is quickly absorbed therein. It is desirable that the hydrogen storage base 2 be amorphous. The hydrogen storage base 2 being in the form of a thin film also contributes to quick absorption of hydrogen.

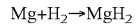

$Mg+H_2 \rightarrow MgH_2$

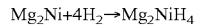

$Mg_2Ni+4H_2 \rightarrow Mg_2NiH_4$

Thus, by mixing Mg 4 and $Mg_2Ni$ 5, a hydrogen storage alloy is obtained which exhibits both a high ability to store hydrogen and a high ability to cause hydrogen to diffuse in it in the solid state, provided by Mg 4 and $Mg_2Ni$ 5, respectively. This movement of hydrogen does not require heat nor pressure, which means that hydrogen can be absorbed at room temperature and atmospheric pressure.

The catalytic layer 3 is formed of Pd (palladium). The catalytic layer 3 is formed to cover the entire surface of the hydrogen storage base 2. Alternatively, the catalytic layer 3 may partly cover the surface of the hydrogen storage base 2. Pd catalyzes dissociation of molecular hydrogen into hydrogen atoms ($H_2 \rightarrow 2H$). Hydrogen in the form of atoms is most quickly absorbed in Mg. Unlike Pt, Pd does not have the ability to catalyze ionization of hydrogen atoms. Thus, use of Pd as a catalyst allows hydrogen to stay in the form of atoms, which leads to quick absorption of hydrogen compared with when Pt is used as a catalyst.

When the above-described hydrogen storage alloy 1 is used to store hydrogen, hydrogen 6 contained in gases contacts the Pd catalytic layer 3 and is dissociated into hydrogen atoms. Then, the hydrogen atoms are absorbed in Mg 4 and $Mg_2Ni$ 5 in a surface region of the hydrogen storage base 2. The hydrogen atoms thus absorbed is further absorbed in Mg 4 and $Mg_2Ni$ 5 in an inner region of the hydrogen storage base 2 by virtue of $Mg_2Ni$ 5.

In place of the aforementioned $Mg_2Ni$, other magnesium-nickel alloys, magnesium-titanium alloys, magnesium-niobium alloys, magnesium-manganese alloys, or magnesium-cobalt alloys may be used. The catalytic layer 3 may be formed of a substance other than Pd (palladium), such as Pt (platinum), Nb (niobium) or ZrNi(zirconium nickel).

Figure 7:
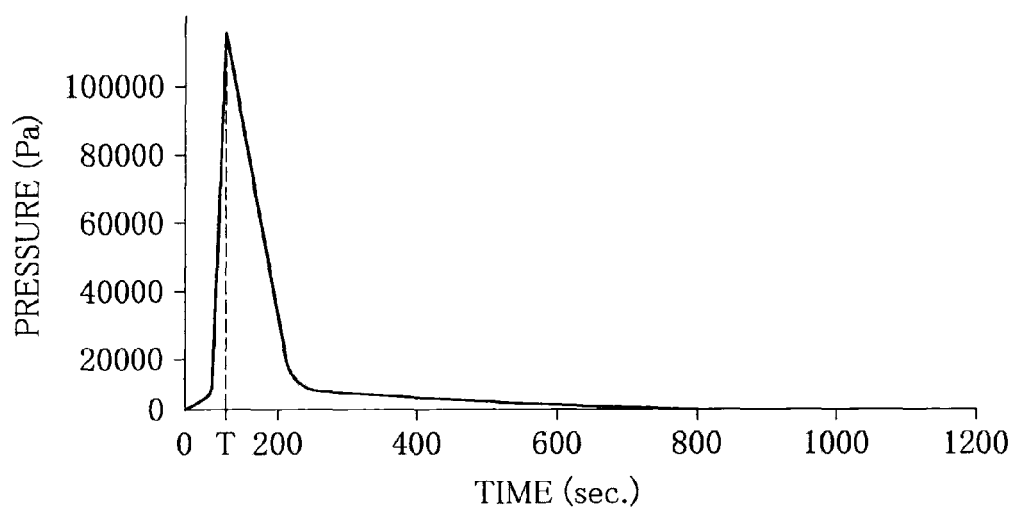
FIG. 7 is a graph showing how pressure varies with time when hydrogen is absorbed with a hydrogen storage unit according to the present invention.

FIG. 7 is a graph showing how pressure varies with time when hydrogen is absorbed with a hydrogen storage unit according to the present invention.

As seen in the graph, as hydrogen is supplied to an evacuated space, pressure in the space increases and hydrogen begins to be absorbed in the hydrogen storage alloy. At time T, supply of hydrogen is stopped, and the hydrogen storage alloy continues absorbing hydrogen. Then, the pressure steeply drops. This drop in pressure means drop in pressure of gaseous hydrogen supplied, and thus, hydrogen being absorbed. It is therefore confirmed that hydrogen is being absorbed quickly.

Specifically, this test was conducted using an apparatus comprising a four-way tube containing a hydrogen storage unit, with its three ports, each fitted with a valve, being connected to a pressure gauge, a vacuum pump and a hydrogen canister, respectively. First, the four-way tube was depressurized with the vacuum pump until the pressure therein was stabilized (approximately 20 Pa). Then the valve connected to the vacuum pump was closed and the valve connected to the hydrogen canister was opened. After hydrogen was supplied so that the pressure in the four-way tube reached a desired value, the valve connected to the hydrogen canister was closed and variation in pressure was monitored with the pressure gauge. In the test conducted, the pressure dropped from 107190 Pa to 320 Pa. The hydrogen storage alloy used was $Mg_2Ni$+Pd and the hydrogen supplied was 100% $H_2$, which was supplied at the rate of 6 (ml/min).

EXPLANATION OF REFERENCE NUMERALS

1: Hydrogen storage alloy
2: Hydrogen storage layer
3: Catalytic layer
4: Mg
5: $Mg_2Ni$
6: Hydrogen
7: Hydrogen storage unit
8: Hydrogen storage fiber
9: Space
10: Nanofiber

The invention claimed is:

1. A hydrogen storage unit, comprising:
   a porous body having holes allowing hydrogen molecules to pass through, the porous body being formed of an assembly of nanofibers, and
   a hydrogen storage alloy covering a surface of the porous body, inclusive of surfaces of the holes thereof, said hydrogen storage alloy including a hydrogen storage base formed of a hydrogen storage material, and a catalytic layer covering a surface of the hydrogen storage base,
   wherein the hydrogen storage base comprises a plurality of spherically-shaped particles, and
   wherein the catalytic layer comprises a plurality of spherically-shaped particles.

2. The hydrogen storage unit according to claim 1, wherein the individual nanofibers are randomly oriented in the assembly.

3. The hydrogen storage unit according to claim 1, wherein the assembly is nonwoven fabric.

4. The hydrogen storage unit according to claim 1, wherein the hydrogen storage base is a layer vapor-deposited on the surface of the porous body.

5. The hydrogen storage unit according to claim 1, wherein the hydrogen storage base is formed of a mixture of magnesium and an alloy selected from a group consisting of a magnesium-nickel alloy, a magnesium-titanium alloy, a magnesium-niobium alloy, a magnesium-manganese alloy and a magnesium-cobalt alloy.

6. The hydrogen storage unit according to claim 5, wherein the catalytic layer is formed of Pd.

* * * * *